US009630249B2

(12) United States Patent
Toyserkani et al.

(10) Patent No.: US 9,630,249 B2
(45) Date of Patent: Apr. 25, 2017

(54) SYSTEMS AND METHODS FOR ADDITIVE MANUFACTURING OF HETEROGENEOUS POROUS STRUCTURES AND STRUCTURES MADE THEREFROM

(71) Applicants: Ehsan Toyserkani, Waterloo (CA); Mihaela Vlasea, Kitchener (CA); Yaser Shanjani, Aurora (CA)

(72) Inventors: Ehsan Toyserkani, Waterloo (CA); Mihaela Vlasea, Kitchener (CA); Yaser Shanjani, Aurora (CA)

( * ) Notice: Subject to any disclaimer, the term of this patent is extended or adjusted under 35 U.S.C. 154(b) by 0 days.

(21) Appl. No.: 14/761,364

(22) PCT Filed: Jan. 17, 2014

(86) PCT No.: PCT/CA2014/050028
§ 371 (c)(1),
(2) Date: Jul. 16, 2015

(87) PCT Pub. No.: WO2014/110679
PCT Pub. Date: Jul. 24, 2014

(65) Prior Publication Data
US 2015/0352639 A1    Dec. 10, 2015

Related U.S. Application Data

(60) Provisional application No. 61/753,504, filed on Jan. 17, 2013.

(51) Int. Cl.
*B32B 3/02* (2006.01)
*B22F 7/00* (2006.01)
(Continued)

(52) U.S. Cl.
CPC .............. *B22F 7/002* (2013.01); *B28B 1/001* (2013.01); *B29C 67/0081* (2013.01);
(Continued)

(58) Field of Classification Search
CPC ......... B22F 7/002; B33Y 10/00; B33Y 30/00; B28B 1/001; B29C 67/0081; B29C 67/0085; B29C 67/02; Y10T 428/24851
See application file for complete search history.

(56) References Cited

U.S. PATENT DOCUMENTS 5,490,962 A    2/1996  Cima et al.
5,869,170 A    2/1999  Cima et al.
(Continued)

FOREIGN PATENT DOCUMENTS

EP        1764208        3/2007

OTHER PUBLICATIONS

Canadian Intellectual Property Office as International Searching Authority, International Search Report and Written Opinion for PCT Patent Appln. No. PCT/CA2014/050028, Mar. 7, 2014.

*Primary Examiner* — Elizabeth Mulvaney
(74) *Attorney, Agent, or Firm* — Gowling WLG (Canada) LLP; Neil Henderson

(57) ABSTRACT

A system and method for additive manufacturing of heterogeneous porous structures, and structures made therefrom. The system includes: a powder feeding module for depositing layers of powder material; a binder module for dispensing powder binding material; a porogen module for selectively depositing at least one porogen to the layers of powder material, wherein the at least one porogen is removable to produce at least one predetermined porosity in the part; and a controller to control the powder feeding module, binder module and porogen module. The method includes: forming a layer by performing at least one of: applying a powder to a substrate; applying a binder to the powder; applying at least one porogen to the powder based on a predetermined pattern; and forming additional layers until a (Continued)

predetermined number of layers is reached, wherein at least one of the layers includes a porogen.

19 Claims, 9 Drawing Sheets

(51) Int. Cl.
*B29C 67/00* (2017.01)
*B28B 1/00* (2006.01)
*B29C 67/02* (2017.01)
*B33Y 10/00* (2015.01)
*B33Y 30/00* (2015.01)

(52) U.S. Cl.
CPC .......... *B29C 67/0085* (2013.01); *B29C 67/02* (2013.01); *B33Y 10/00* (2014.12); *B33Y 30/00* (2014.12); *Y10T 428/24851* (2015.01)

(56) References Cited

U.S. PATENT DOCUMENTS

| | | |
|---|---|---|
| 7,087,200 B2 | 8/2006 | Taboas et al. |
| 7,229,586 B2 | 6/2007 | Dunlap et al. |
| 7,296,990 B2 | 11/2007 | Devos et al. |
| 2005/0074596 A1 | 4/2005 | Nielsen et al. |
| 2007/0063372 A1 | 3/2007 | Nielsen et al. |
| 2010/0256746 A1 | 10/2010 | Taylor et al. |

FIG. 2

Pre-Processing
- 212: 3D CAD Component Build File Sequence

Processing (220)
- 222: Hardware Initialization
- 224: Spread Powder Layer
- 226: Print Binder over Powder Layer
- 228: Deposit Sacrificial Polymer Features
- 230: Cure Sacrificial Polymer Features
- 232: Insert Sacrificial Porogen Particles
- 234: Cure Sacrificial Porogen Particles
- 236: Initialize Hardware for New Layer Post-Processing (250)
- 252: Heat Treatment Protocol

SYSTEMS AND METHODS FOR ADDITIVE MANUFACTURING OF HETEROGENEOUS POROUS STRUCTURES AND STRUCTURES MADE THEREFROM

FIELD

The present disclosure relates generally to additive manufacturing. More particularly, the present disclosure relates to the additive manufacturing of heterogeneous porous structures and the structures themselves.

BACKGROUND

Conventional powder-based additive manufacturing is a versatile layer-by-layer fabrication process. Using additive manufacturing, it is possible to build three-dimensional (3D) structures based on computer-aided design (CAD) with relatively complex internal and external architecture. However, there are constraints imposed by conventional system capabilities. Conventional powder-based additive manufacturing processes suffer from limitations in terms of the smallest achievable internal features, in-situ control of micro- and macro-porosity, material composition, and mechanical properties. For example, in current powder-based additive manufacturing methodologies, the micro- and macro-porous bulk characteristics as well as build material composition are generally homogeneous in nature because the process allows for the use of a single powder material. Internal features or porosity of structures are also difficult to make/control due to issues in removing trapped support materials or loose powder embedded within inner cavities or channel-like features.

Because of at least some of these issues, conventional additive manufacturing processes have difficulty producing structures with appropriate conformal channels, porous and material characteristics that are required in various applications, including industrial and bio-medical applications.

SUMMARY

It is an object of the present disclosure to obviate or mitigate at least one disadvantage of previous structures, systems and methods.

In a first aspect, the present disclosure provides a system for additive manufacturing, the system including: a powder feeding module for depositing layers of powder material; a binder module for dispensing powder binding material, wherein the binding material is for binding the layers of powder material; a porogen module for selectively dispensing at least one porogen to the layers of powder material, wherein the at least one porogen is configured to be removable to produce at least one predetermined porosity in the part; and a controller to control the powder feeding module, binder module and porogen module based on a digital rendering of the structure.

In a particular case, the at least one porogen includes a plurality of porogens and the porogen module includes a plurality of dispensing modules, wherein each dispensing module can be controlled to selectively deposit at least one of the plurality of porogens.

In another particular case, the porogen module includes a pulsed laser dispensing module comprising: a pulsed laser; and a film of photopolymer; wherein the pulsed laser is configured to contact the photopolymer to produce at least one drip from the film of photopolymer such that the at least one drip falls and is deposited to the layer of powder material as the at least one porogen.

In still another particular case, the porogen module includes an electrostatic system and a pneumatic system; wherein the electrostatic system is configured to trap at least one porogen onto a charged plate and the pneumatic system is configured to release the at least one porogen onto the powder material.

In still another particular case, the porogen module includes a vacuum system and a pneumatic system; wherein the vacuum system is configured to trap at least one porogen using vacuum and then release the at least one porogen onto the powder material.

In yet another particular case, the porogen module further includes a curing module configured to cure the at least one drip while the at least one drip falls.

In another particular case, the system may include a curing module configured to cure the at least one porogen.

In another particular case, the system may include a post-processing module configured to perform at least one of: sinter the powder material; and remove the porogen.

In another particular case, the powder material includes at least one of ceramics, metals, and polymers.

In another particular case, the powder material and the binding material include biocompatible materials.

In another particular case, the at least one porogen includes at least one of polymeric material, thermoplastic material, and photosensitive polymeric material.

In another particular case, the system may include a compaction module configured to compact at least one of the powder, the binder and the at least one porogen after depositing at least one layer, wherein the compaction module comprises a roller and the controller controls at least one of the linear velocity and rotational velocity of the roller to provide a predetermined compaction force.

In yet another particular case, the powder feeding module includes a powder compartment, which contains the powder material, and a build compartment on the substrate into which the powder material is placed by the roller.

In a further aspect, the present disclosure provides a method for additive manufacturing of a porous structure, the method including: forming a layer by performing at least one of the following: applying a powder to a substrate; applying a binder to the powder; applying at least one porogen to the powder based on a predetermined pattern; and forming additional layers until a predetermined number of layers is reached, wherein at least one of the layers includes a porogen.

In a particular case, the method may further include curing the at least one porogen at the time the at least one porogen is applied.

In another particular case, the method may further include compacting, using a compaction force, at least one layer.

In another particular case, the method may further include removing the one or more porogens.

In yet another particular case, the removing of the one or more porogens includes the application of heat.

In another particular case, the powder is a plurality of powders having differing characteristics.

In another particular case, applying the powder includes selectively aligning a feed compartment, which contains the powder, with a build compartment associated with the substrate, and adjusting the height of a base of the feed compartment to dispense a predetermined thickness of powder into the build compartment and onto the substrate.

In another particular case, the size of the porosity generated by the at least one porogen is below approximately 500 micrometers.

In a further aspect, a heterogenous porous structure is formed by the method described above.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 2 illustrates a high level flow chart of the Additive Porous Manufacturing process.

DETAILED DESCRIPTION

Figure 1:
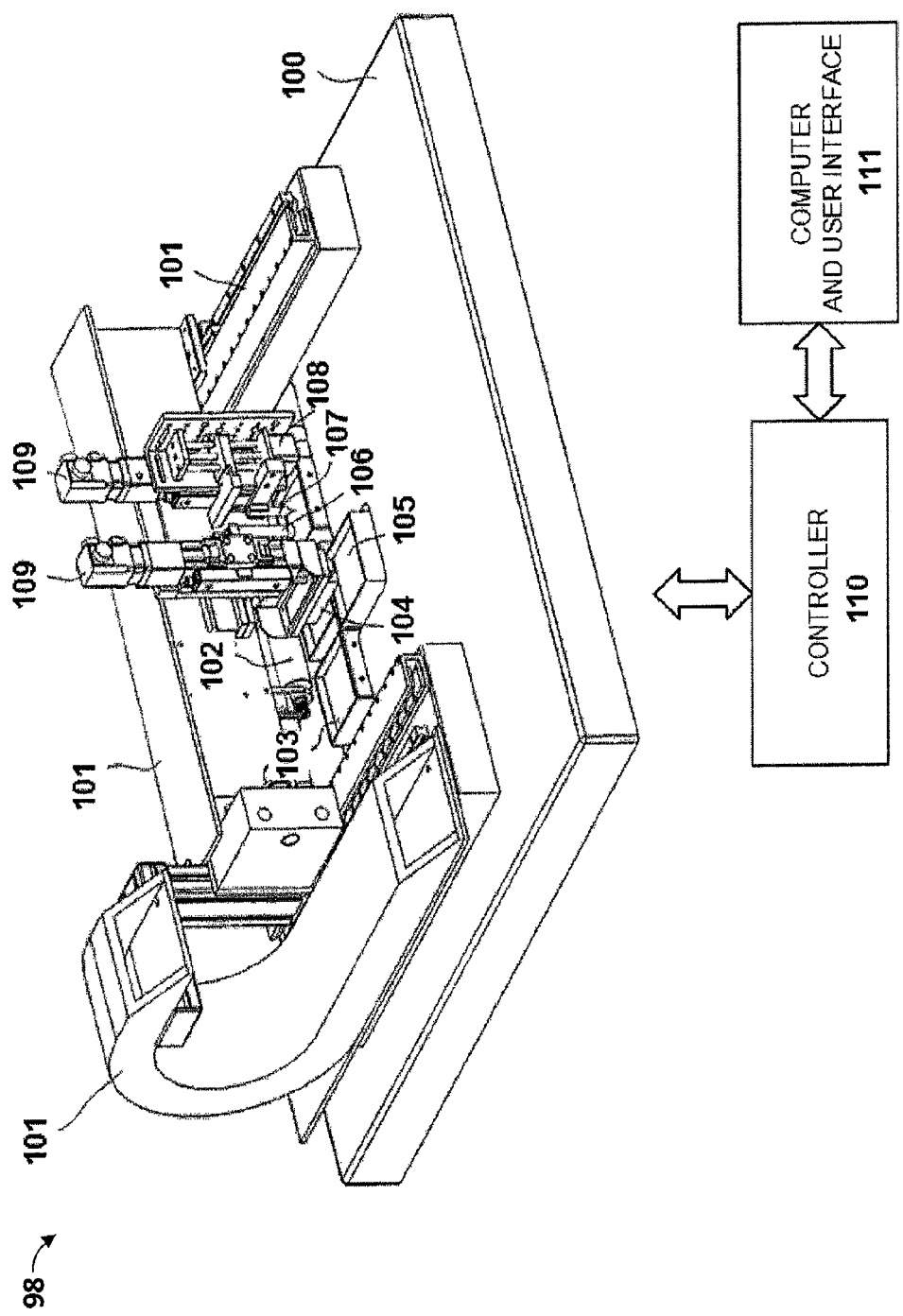
FIG. 1 is a schematic of such an Additive Porous Manufacturing according to an embodiment.

The present disclosure relates generally to structures having heterogeneous porosity properties and methods and systems for manufacturing the same. More particularly, the present disclosure relates to additive manufacturing methods and systems for generating three dimensional structures of varying porosity and heterogeneous properties.

In an embodiment, an additive manufacturing process controls the production of heterogeneous or functionally graded internal features, generally referred to as porosities or porosity, and material properties of structures produced using a modified powder-based additive porous manufacturing approach. Using such processes, a sacrificial material (generally referred to as a porogen), such as for example polymeric materials, can be injected/deposited within a powder layer to form porosity/channels/internal features (generally referred to as porosities or porosity) corresponding to the structure slice being manufactured using a computer-aided design (CAD) tool and a manufacturing platform. In some cases, the manufacturing process may use a post-processing heat treatment procedure to concomitantly sinter the structures and to remove the sacrificial material (porogen) in order to eventually form channels (including networks of channels) or macro-porous structures within the structure. This fabrication method is particularly intended for fabricating ceramic structures where a refined feature size and internal structure complexity are useful criteria.

Using this type of system and method, an additive manufacturing technique can be used to create micro-channels within ceramic structures. The system and method is intended to have the capability for the formation of inner-channels with complex geometry and orientation. In particular, the predetermined pattern of channels may be designed in a pre-process stage in a CAD environment. The design of the channels may be developed based upon the requirements of the final structure and desired mechanical properties. Based on required functionality, a desirable complex-shaped channel feature may be in the range of 100-500 µm in size. Conventional additive manufacturing methods have difficulty in producing small features such as complex micro-channels, pores and holes embedded in structures, as loose powder may become trapped within the channels or pores. The smallest internal feature of a structure is influenced by the binder injection parameters, binder viscosity, lateral binder infiltration and liquid imbibition. In conventional systems and methods, in addition to binder dispensing factors, the powder particle size and powder compaction also contribute to a high potential for having trapped particles inside the structure when designing internal cavities, channels or macro-pores. It is difficult to achieve internal channels with features below 500 µm in size using conventional methodologies. This issue becomes even more apparent in manufacturing constructs with complex conformal channels, as it becomes increasingly difficult to remove trapped support powder materials. The embodiments of the system and method described herein are intended to resolve this limitation by, for example, allowing the resulting channels to be continuous and include small features that are below 500 µm in size, particularly within structures made using calcium polyphosphate (CPP) as the powder material. It is anticipated that embodiments of the system and method herein will allow features that are below 400 µm, 300 µm, 200 µm or 100 µm in size or better, depending on the materials used.

Embodiments of the system and method herein are also intended to be able to selectively create porosities within porous structures. In particular, the capability of forming porous spaces within a structure based on predetermined patterns designed in a pre-processing stage in a CAD environment. The design of the porous spaces may be developed based upon the requirements of the final structure and desired mechanical properties. Conventional powder-based additive manufacturing approaches have difficulty in producing isolated porosities within the structure due to support material entrapment within the structure. In contrast, a porous manufacturing system and method according to embodiments herein is intended to be capable of producing controlled porosities by selectively depositing sacrificial porogens at desired locations based on requirements of the structure.

Embodiments of the system and method herein are further intended to be capable of controlling the micro- and macro-structure, mechanical properties and material composition of structures. Conventional powder-based additive manufacturing approaches typically accommodate for a single stock powder type or size in constructing the desired structure, resulting in a homogeneous composition and micro-structure of the resulting product. The additive porous manufacturing system and method according to embodiments herein is intended to be capable of integrating multiple powder types or sizes within one structure. This approach allows for production of products with predetermined heterogeneous material composition, micro- and macro-structure and mechanical properties.

Still further, embodiments of the system and method herein are further intended to be capable of controlling the compaction force of the powder substrate as it is being delivered from a supply feed bed area to a build bed area. Conventional additive manufacturing approaches have difficulty in accommodating for this functionality. The additive porous manufacturing system and method according to embodiments herein is intended to be capable of controlling the powder compaction force during material spreading by selectively controlling the linear and rotational velocity of a counter-rotating roller mechanism. This is unlike conventional powder-based additive manufacturing methodologies, which typically do not have the capability to modulate the compaction force during deposition of a new powder material layer and the capability to correlate the liquid binder gradient dispersed onto the powder substrate with resulting mechanical and structural properties.

FIGS. 1 through 8 illustrate embodiments of systems and methods for additive manufacturing of heterogeneous porous structures.

Referring to FIG. 1, an embodiment of an additive porous manufacturing system 98 is illustrated. The system 98 includes a platform 100 with a precision gantry assembly 101. The precision gantry assembly 101 has two degrees of freedom in the x-y direction. The additive porous manufacturing system also includes two high precision motorized vertical z-axes movers 109, a binder module 104 for dispensing the binder (not shown), a porogen module 106 for dispensing one or more porogens (in some cases, the porogen module may include a plurality of dispensing methods, for example an electrostatic porogen dispensing module 106 and a micro-syringe porogen dispensing module 107), a porogen curing module 108, a powder feeding module (including a roller 102, a build bed compartment 105, one or more powder stock feed bed compartments 103) and a controller 110. The controller 110 is connected to a computer 111 to manage CAD files slicing, graphical user interface, hardware communication and control over associated process parameters. The controller 110 or the computer 111, or both, may include software, user interfaces and electrical systems to run the associated system and module features.

FIG. 2 illustrates a flow chart of an embodiment of an additive porous manufacturing process 200. The process 200 includes pre-processing 200, processing 220 and post-processing 250 phases. It will be understood that the various phases may also be integrated together as appropriate depending on application requirements.

In the pre-processing phase 210, the system interface allows for customization 212 of the CAD model in terms of processing the 3D CAD model. The 3D model is used to extract data as two-dimensional (2D) layer slices. As well, the slices may be customized by assigning different material types or sizes to each layer; assigning porogen particle distribution to desired locations within the layer to selectively control porosity; assigning layer channels to selectively control cavities or interconnected networks of cavities; customizing the compaction force; and/or customizing grayscale binder distribution for the specific layer to control the micro-porosity of the product based on user requirements.

In the processing stage 220, the additive porous manufacturing system meets the pre-processing 210 requirements by controlling the various modules based on the pre-processing input by generating layers of powder with predetermined characteristics. For example, within a specific layer, the counter-rotating roller may be velocity-controlled to spread the stock powder to create a new layer in the structure. Based on specific layer requirements, the system may employ the electrostatic porogen dispensing module 106 and/or the micro-syringe porogen dispensing module 107 to produce the desired sacrificial structures within the layer. The process is typically repeated until the structure is completed in a layer-by-layer fashion.

The pre-processing stage 210 is intended to allow for customization of internal structure characteristics which would allow for selectively integrating sacrificial elements within corresponding build layers during manufacturing to control internal properties. The pre-processing 210 may also allow for real-time selection of powder materials in each layer and control of powder spreading and liquid binder injection parameters.

During processing 220, the hardware for additive manufacturing of the porous structure is initialized 222. A powder layer is then spread 224 on the build bed 105. The binder is then dispensed (or printed) on or within the powder layer 226. One or more porogens are then deposited 228 or inserted 232 on or within the powder layer by the porogen module 106. The deposited and/or inserted porogens are then cured (230, 234). If there are more layers to be manufactured, the hardware for additive manufacturing the porous structure is then reinitialized 236 for the repetition of layer creation starting with the repetition of spreading 224 the powder layer. It will be understood that the order of operations noted for this embodiment may be altered as appropriate for the needs of a particular application or based on the materials in use or the like.

The post-processing stage 250 allows for the green structure to be finalized, for example by heat treatment 252, to all for sintering or removal of porogens. In some embodiments, the removal of sacrificial elements (porogens) may be a part of the same process for sintering or may be separate therefrom.

Figure 3:
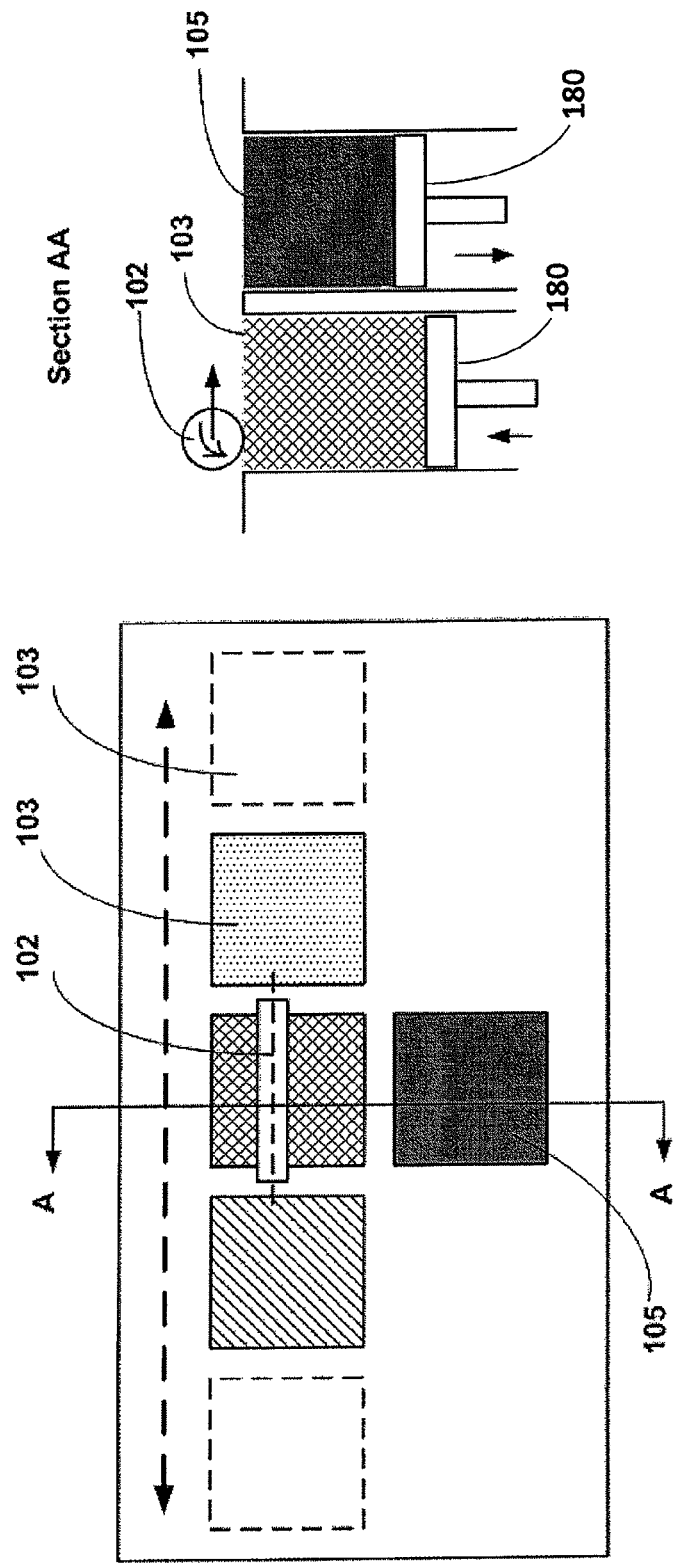
FIG. 3 is an illustration of a multi-powder feed stock assembly and a powder spreading counter-rotating velocity controlled roller.

FIG. 3 schematically illustrates aspects of the powder feeding module, in particular, the arrangement of a plurality of powder material compartments 103 with respect to a build bed compartment 105. The storage stock powder compartments 103 are able to selectively align with the build bed compartment 105 depending on the desired type of material required during manufacturing. The stock powder material compartments 103 and the build bed compartment 105 respectively include a high precision motor that controls the powder elevation with respect to a baseline, via, for example, pistons 180. While spreading one layer, the elevation of the respective stock powder compartment 103 elevates, raising the powder above the baseline. The counter-rotating roller 102 spreads powder above the baseline and spreads it uniformly on the build bed compartment 105. The elevation of the build bed compartment 105 and stock powder material compartment 103 with respect to the baseline are used to control the layer thickness.

Figure 4:
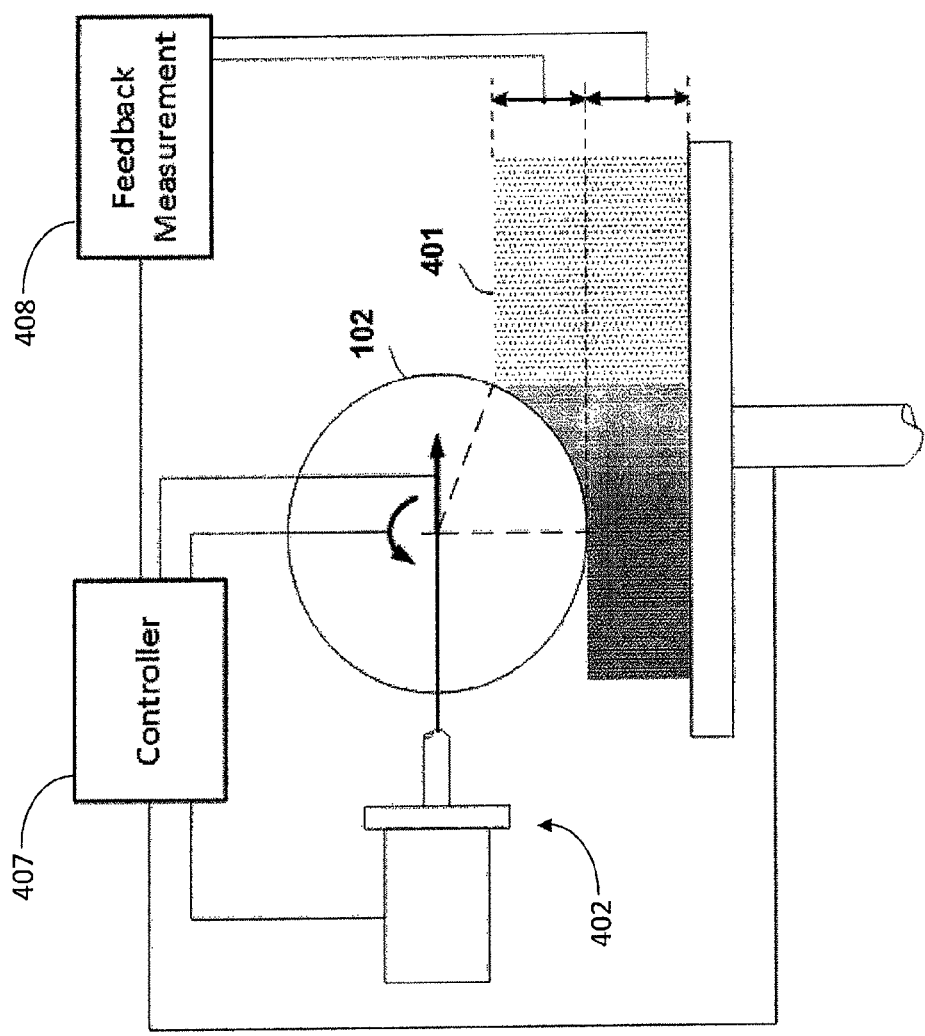
FIG. 4 is a schematic view illustrating a velocity controlled roller mechanism with accompanying feedback and control systems.

FIG. 4 is a schematic illustration of the operation of the counter-rotating roller. The roller 102 and its actuators 402 are illustrated. The system includes a feedback measurement device 408, such as, for example, a camera, for measuring the layer thickness. The system may also include surface mounted pressure sensors for measuring the compaction force. As well, there is a control system 407 that performs any suitable type of algorithm, such as PID, fuzzy or intelligent controls, for controlling the operation of the counter-rotating roller 102. The control system 407 may be part of the controller 110 or a sub-component thereof. The feedback measurement device 408 provides the signals for control of the desired parameters. The control system 407 will then, accordingly, adjust the linear speed and/or spinning of the roller 102. The linear and rotational velocity of the counter-rotating roller 102 will influence the compaction force of powder during spreading of a new particulate layer, according to models known in the art (for example, knowledge-based models), thus affecting material density and micro-porosity.

In the various embodiments herein, the porogen module 106 may include one or more types of porogen dispensers, including one or more types of porogens, either in different types of dispensers or in one type of dispenser itself depending on the nature of the dispenser.

Figure 5:
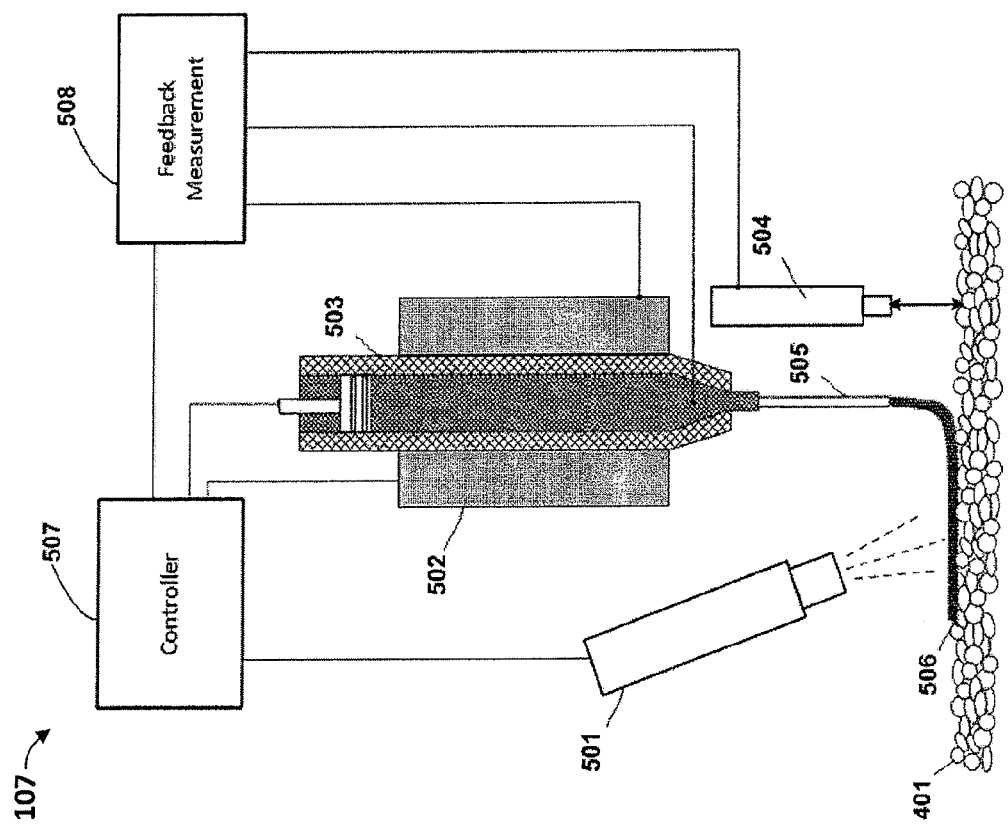
FIG. 5 is a schematic view illustrating a sacrificial polymer micro-dispensing module with accompanying sacrificial material curing modules, feedback and control systems.

FIG. 5 shows an embodiment of the micro-syringe porogen dispensing module 107. In this case, the micro-syringe porogen dispensing module 107 is closed-loop controlled. The micro-syringe dispensing module 107 is used for the precise injection of sacrificial polymeric micro-sized tracks, channels or networks. The tracks may be interconnected or intermittent on the particulate substrate. The micro-syringe dispensing module 107 can be piston-actuated or pressure-actuated. The tracks may become interconnected channel features or isolated cavities in the mature structure, after heat treatment or other porogen removal (for example, disintegration) methods. The micro-syringe dispensing module 107 comprises a sacrificial material curing module 501 used for stabilizing the deposited polymer track; a precision positioning system 502; a temperature controlled wall 503 for maintaining a stable process dispensing temperature; and a precision height measurement module 504 to estimate the location of the micro-syringe dispensing nozzle 505 with respect to the powder substrate 401. The physical properties of the dispensed sacrificial material 506, such as height and width, are controlled using a collection of feedback signals 508 in conjunction with a controller 507. The feedback signals can be gathered and sent from any device that can measure the height or width of the deposited track in real-time, such as a proximity sensor, visual cues, camera feedback, or the like. In addition, the pressure inside the barrel is measured with any type of pressure sensor known in the art, such as fiber optic, piezoelectric, or the like. The measured feedback signals are sent back to the controller 507. The controller 507 can employ a suitable control scheme known in the art, such as PID, fuzzy, intelligent control or the like. In a further case, there may be an array of multiple micro-syringe dispensing modules 107 for injecting materials with different predetermined properties. It will be understood that controller 507 may be a part of the controller 110 or a sub-component thereof.

Figure 6A:
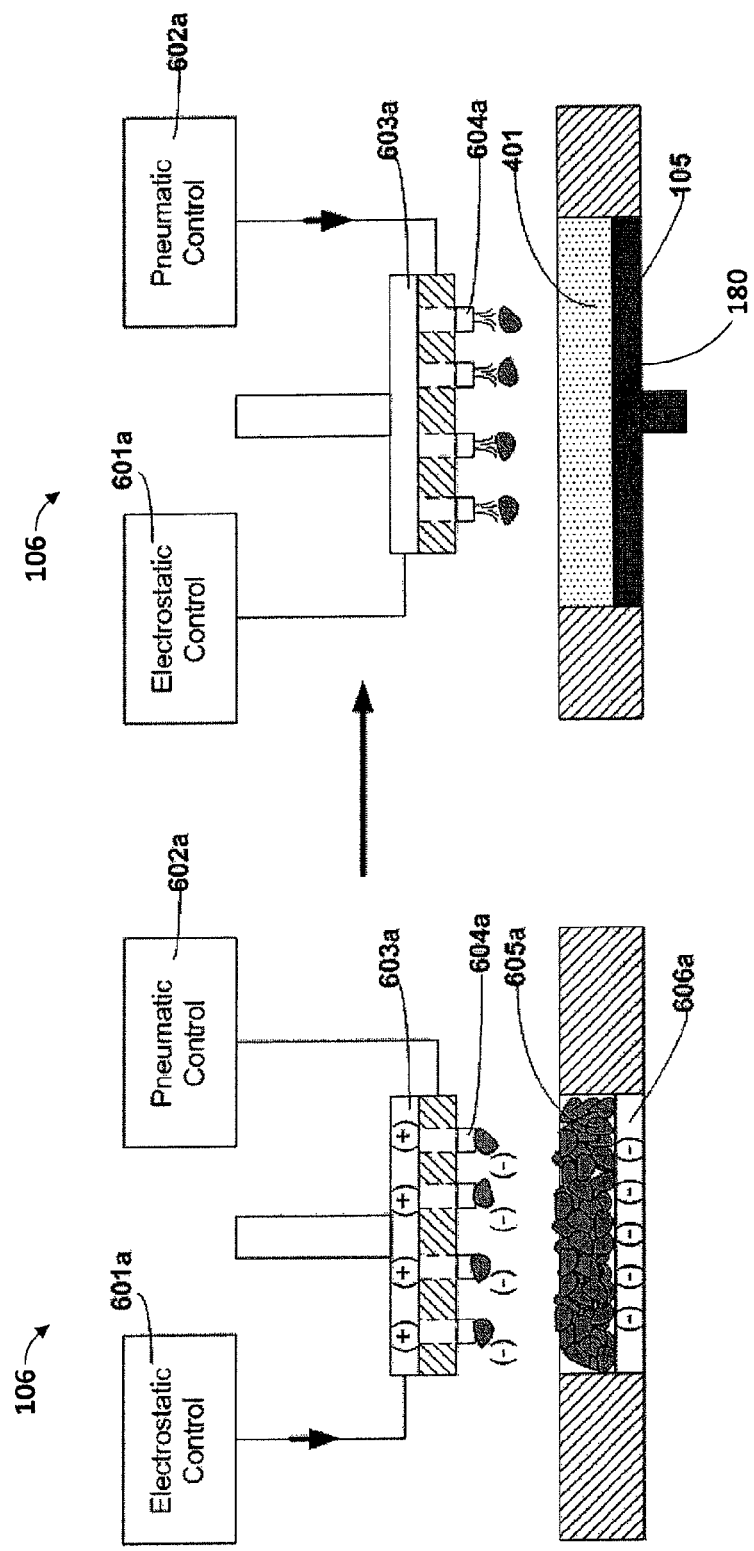
FIG. 6A is a schematic view of the sacrificial porogen insertion unit with electrostatic control of porogens.
Figure 6B:
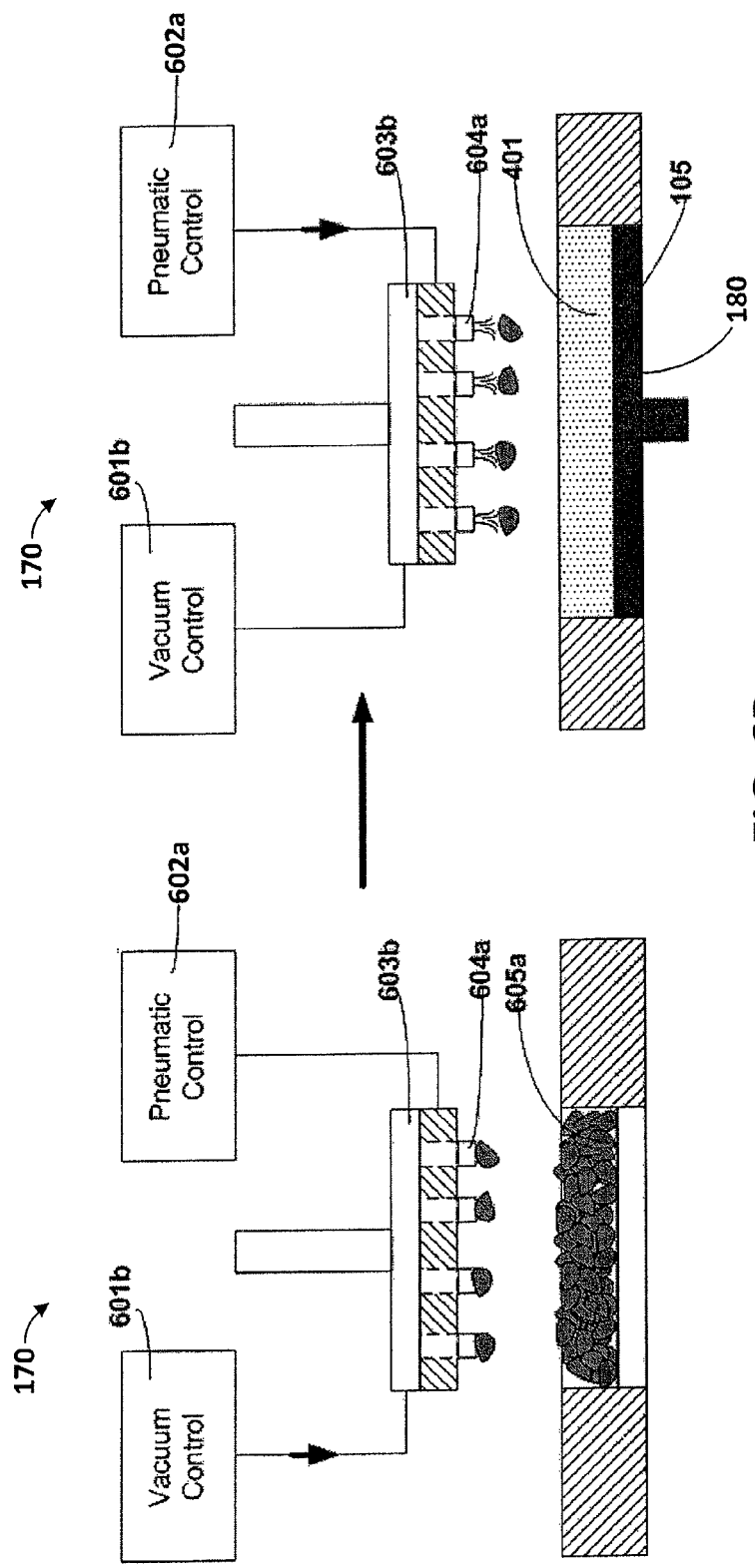
FIG. 6B is a schematic view of the sacrificial porogen insertion unit with vacuum control of porogens.

FIG. 6A and FIG. 6B schematically illustrate the electrostatic porogen dispensing module 106 and a vacuum porogen dispensing module 170. Referring to FIG. 6A, an electrostatic generator and control system 601a is connected to an electrostatic charge plate 603a (collectively, an electrostatic system) which is used to pick up porogens 605a. A pneumatic system includes a control system 602a used to control air flow through pneumatic channels 604a in order to release porogen particles 605a when desired. The electrostatic charged plate 603a is configured to include any predetermined number of internal holes called pneumatic channels 604a. The pneumatic channels 604a have a predetermined arrangement and are electrostatically charged to pick up small sized polymer particles 605a from a porogen feeder. The porogen dispensing module 106 is then moved to the build bed compartment 105 and porogen particles 605a are selectively released, using the pneumatic pressure control system 602a, by expelling air through the pneumatic channels 604a.

Referring to FIG. 6B, the vacuum porogen dispensing module 170 includes a vacuum system 601b and the pneumatic control 602a connected to a vacuum substrate 603b. The vacuum substrate 603b includes a predetermined number of small holes 604a. The sacrificial polymer particles 605a are picked up into the holes 604a by the vacuum system 601b and moved to the build bed compartment 105. The vacuum system 601b is then discontinued and the pneumatic control system 602a is pressurized to blow the particles 605a to the desired location in the build bed compartment 105. It will be understood that the vacuum system and pneumatic system may be combined to provide both suction and expulsion from the holes 604a.

Figure 7:
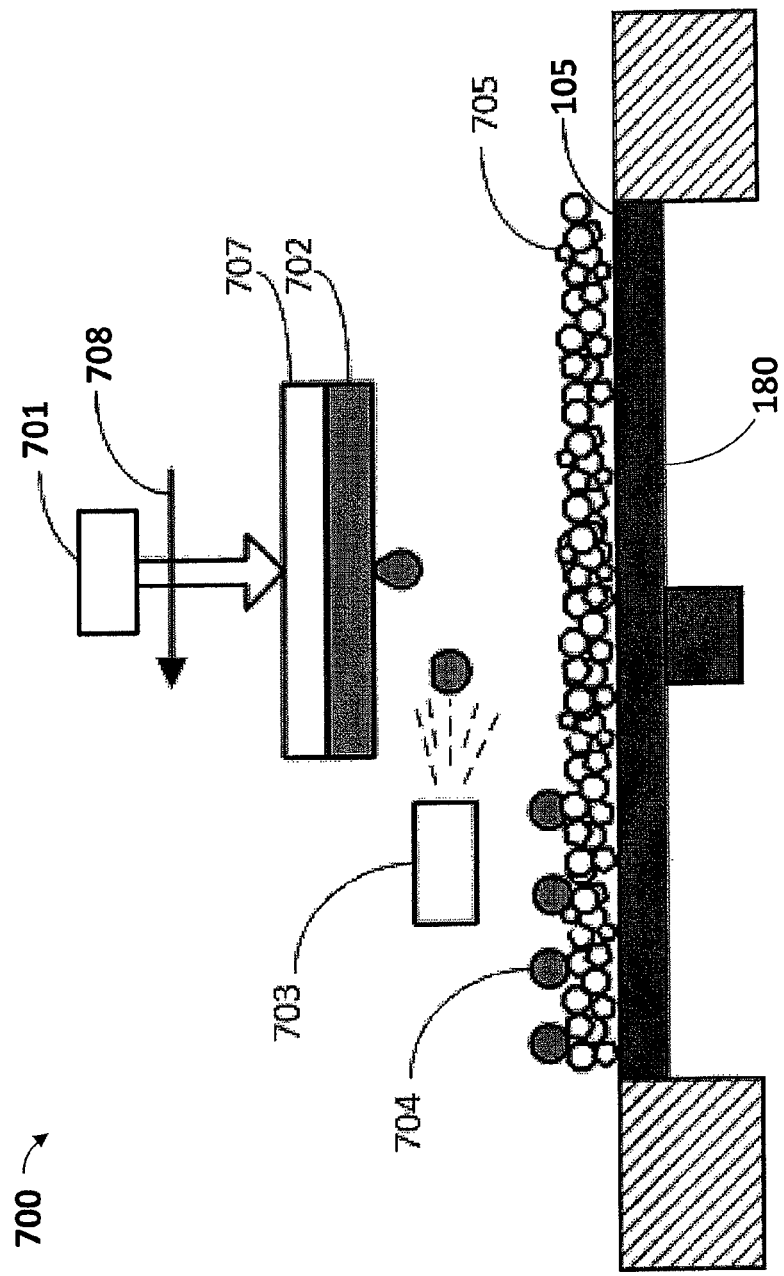
FIG. 7 is a schematic view of the Laser-Induced Sacrificial Particle Drip Generator and accompanying UV light.

FIG. 7 schematically illustrates a laser dispensing module 700 that may be a part of the porogen module 106. The laser dispensing module 700 is sometimes referred to as the Laser-Induced Sacrificial Particle Drip Generator (LISPDG) 700. The LISPDG 700 is used to create porogens on particulate surfaces. With a LISPDG 700, a pulsed laser 701, with a range of acceptable wavelength capabilities, is used to create drips 704 from a thin film of photopolymer 702 coated on, for example, a glass or translucent plate 707. In this case, the laser 701 also moves along the glass plate 707 in the direction of arrow 708 at the same time that the glass plate 707 moves above the build compartment 105. The drips 704 fall onto a powder layer 705 in the build compartment 105. In some cases, while falling, the drips 704 are cured by a UV light system 703.

Figure 8:
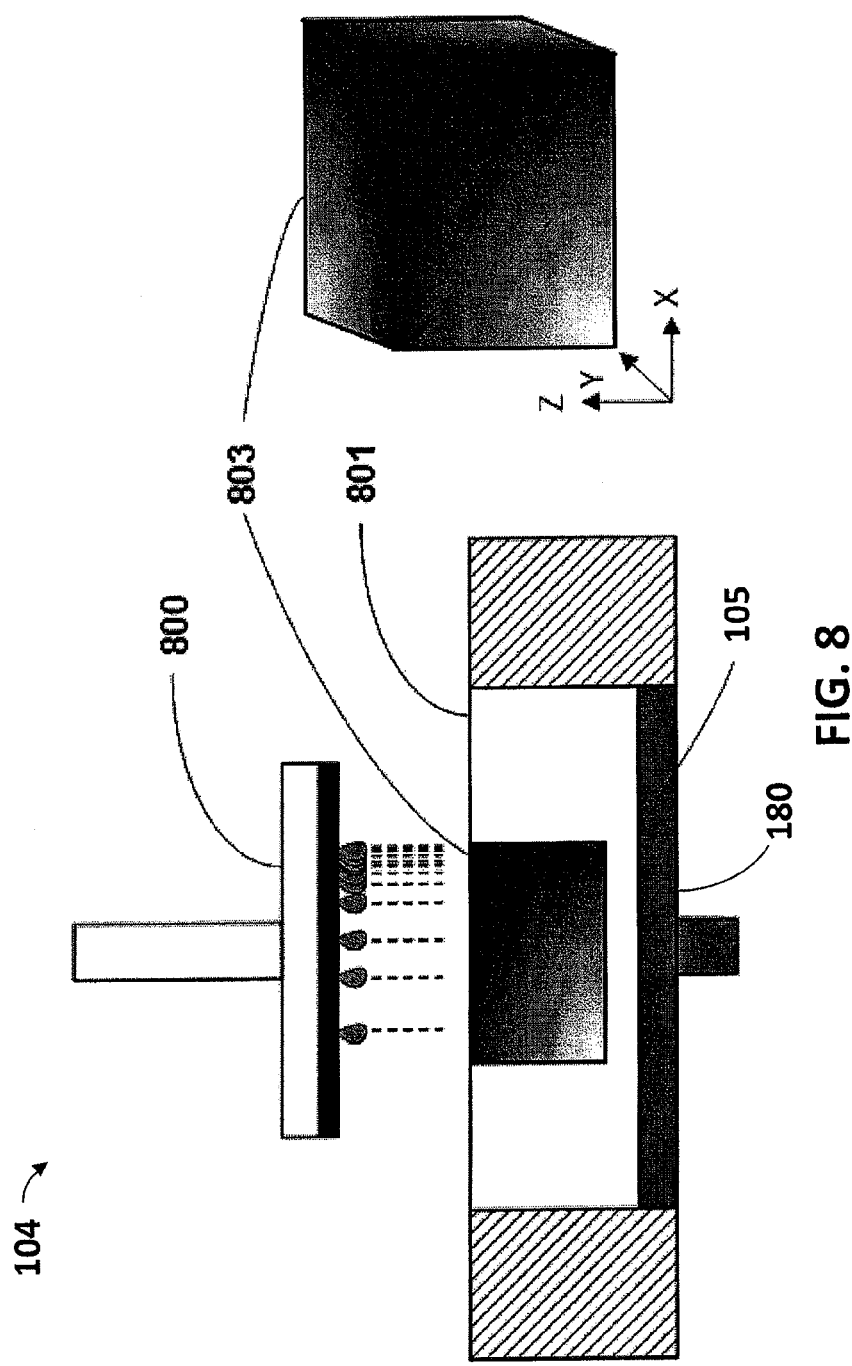
FIG. 8 is a schematic view of the gray-scaling liquid binder jetting approach.

FIG. 8 illustrates an embodiment of system 98 in which the binder module 104 allows for grayscale printing capability. In this embodiment, the binder module 104 includes a specialized printhead 800 to control the grayscale binder distribution levels onto the powder layers 801 in the build bed 105. In this way, the application of binder can be varied such that the resulting green structure 803 has a gradient in mechanical properties based on the binder greylevel saturation levels dispersed by the printhead 800 in each layer. Although illustrated as a rectangle, it will be understood that the green structure 803 can be of complex 3D shape. In the structure 803, it can be seen that a large quantity of binder has been used at the top right corner than in the bottom left corner and that there is a gradient. The grayscale printing capability can be expanded to multiple printheads 800 in order to inject different types of binder fluids with a grayscale gradient. In particular, the terms 'grey level' or 'grayscale level' can refer to the gradient in binder fluid volume dispersed onto the powder substrate.

It will be understood that the functions and operations of all, or some, of the controllers and control systems described herein, including controllers 110, 407, 507, 601a, 602a, 601b, and 602b, may be undertaken by a single controller/control system, such as controller 110 or may be distributed in various ways.

In some embodiments, some or all of the porogen material may be configured to remain after post-processing as part of the structure, without being sacrificially removed. The remaining porogen may give the structure certain beneficial properties and characteristics, such as increased strength or flexibility.

In some further embodiments, the remaining porogen can itself have beneficial practical properties, such as acting as catalyst elements. For example, the porogen (such as polyvinyl alcohol or any other biological elements) left after additive manufacturing or post processing may modify the rate of a reaction without being consumed in the reaction. It could be advantageous for a wide variety of applications, including drug delivery and filtration. For example, the porogen may be designed to substantially disintegrate after post-processing but leave behind a beneficial pyrolysis residue such as silver nano particles, which are intended to have an antimicrobial effect in, for example, filters for water purification.

The additive porous manufacturing process described herein can be used in various applications where heterogeneous properties and porosity may be useful. In a particular embodiment, calcium polyphosphate (CPP) is used as the substrate material, polyvinyl alcohol (PVA) solution is used as the binding agent and ethoxylated (10 bisphenol A diacrylate) (EBA) photopolymer solution is used as the sacrificial element (porogen). The characteristics of these materials suggests that they are suitable for biological applications in which additive porous manufacturing produces structures with micro-scale channels.

In another case, lead zirconate titanate (PZT) family of powders can be used as the stock powder material, where polyvinyl alcohol (PVA) is used as the binder. PZT structures with varying porosity can then be produced by additive porous manufacturing. Products produced using these materials could be useful for ultrasonic sensing applications.

In a further case, titanium (Ti) and titanium-alloys family of powder can be used as the stock powder material, where polymeric agents are used as the binder. Titanium-based structures with varying porosity can be useful for, for example, catalyst applications in aerospace and automotive areas.

The embodiments described herein can be particularly useful for manufacturing structures for biological applications. For example, structures used in orthopedic, maxillofacial, craniofacial, dental, tissue engineered scaffolds, implants and bone substitutes. The additive porous manufacturing process can be used to manufacture biological porous implants that temporarily provide mechanical support and act as a template for new bone tissue formation. The design of such an implant considers the internal architecture of bone, which entails interconnected porosity as well as complex networks of channels.

Additionally, additive manufacturing structures described herein can be used for manufacturing in various industries and disciplines including producing piezoelectric sensors and actuators, making filters and membranes, making fuel cells and constructing aerospace structures. Additive manufacturing structures described herein can be used to manufacture complex high-temperature structures with topologically optimized material and mechanical properties. Additionally, it is expected that the molding industry can apply the additive manufacturing structures described herein to produce complex conformal micro-channels and cavities.

The additive manufacturing structures described herein are expected to be used to produce various solid form porous materials. The additive manufacturing structures are particularly useful in producing products made of metallic, polymeric or composite materials, including, for example, titanium and titanium alloys, graphene composites, piezoelectric ceramics, calcium polyphosphates and calcium phosphates.

The systems and methods herein are intended to apply to manufacture of structures with one or more of the following characteristics: functionally graded or heterogeneous material(s), functionally graded or heterogeneous porosity, anisotropic micro-structures, anisotropic macro-structure, anisotropic or isotropic mechanical properties, and/or biodegradable, biocompatible, bioresorbable chemical properties.

The systems and methods herein are also intended to apply to manufacturing of structures with one or more of the following materials: powder ceramics, powder metals, powder polymers, mixture of ceramics-metals-polymers, biocompatible binder solutions, sacrificial polymeric support material (porogen particles, injectable polymers), thermoplastic sacrificial porogens, and photosensitive sacrificial injectable polymers.

Methods and systems have been described that are intended for additive manufacturing of structures with functionally graded porosity, micro- and macro-sized complex internal structures, varying mechanical properties and material compositions using a powder-based additive porous manufacturing system and method. The system and method integrates various modules, including, in some embodiments, a module to control the deposition/insertion of sacrificial porogen particles and/or complex polymeric structures, a module to control the powder compaction force, a module to control the selection of bulk powder particle types or sizes, and a module to control the grayscale binder saturation levels onto the powder substrate. In some embodiments, the green structures produced using this additive porous manufacturing system and method are subjected to a post processing heat-treatment protocol to remove the sacrificial elements through pyrolysis and to sinter the structure powder material.

In the preceding description, for purposes of explanation, numerous details are set forth in order to provide a thorough understanding of the embodiments. However, it will be apparent to one skilled in the art that these specific details may not be required. In other instances, well-known structures and circuits may be shown in block diagram form in order not to obscure the understanding. For example, specific details are not provided as to whether the embodiments described herein are implemented as a software routine, hardware circuit, firmware, or a combination thereof.

Embodiments of the disclosure or aspects thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure.

Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

We claim:
1. An additive manufacturing system, the system comprising:
a powder feeding module for depositing layers of powder material;

a binder module for dispensing powder binding material, wherein the binding material is for binding the layers of powder material;

a porogen module for selectively dispensing at least one porogen to the layers of powder material, wherein the at least one porogen is configured to be removable to produce at least one predetermined porosity in the part;

a curing module configured to cure the at least one porogen; and a controller to control the powder feeding module, binder module and porogen module.

2. The system of claim 1, wherein the at least one porogen comprises a plurality of porogens and the porogen module comprises a plurality of dispensing modules, wherein each dispensing module can be controlled to selectively deposit at least one of the plurality of porogens.

3. The system of claim 1, wherein the porogen module comprises a pulsed laser dispensing module comprising:

a pulsed laser; and a film of photopolymer;

wherein the pulsed laser is configured to contact the photopolymer to produce at least one drip from the film of photopolymer such that the at least one drip falls and is deposited to the layer of powder material as the at least one porogen.

4. The system of claim 3, the porogen module further comprising a curing module configured to cure the at least one drip while the at least one drip falls.

5. The system of claim 1, further comprising a post-processing module configured to perform at least one of: sinter the powder material; and remove the porogen.

6. The system of claim 1, wherein the powder material comprises at least one of ceramics, metals, and polymers.

7. The system of claim 1, wherein the powder material and the binding material comprise biocompatible materials.

8. The system of claim 1, wherein the at least one porogen comprises at least one of polymeric material, thermoplastic material, and photosensitive polymeric material.

9. The system of claim 1, further comprising a compaction module configured to compact at least one of the powder, the binder and the at least one porogen after depositing at least one layer, wherein the compaction module comprises a roller and the controller controls at least one of the linear velocity and rotational velocity of the roller to provide a predetermined compaction force.

10. The system of claim 9, wherein the powder feeding module comprises a powder compartment, which contains the powder material, and a build compartment on the substrate into which the powder material is placed by the roller.

11. A method for additive manufacturing of a porous structure, the method comprising:

forming a layer by performing at least one of the following:

applying a powder to a substrate;

applying a binder to the powder;

applying at least one porogen to the powder based on a predetermined pattern;

curing the at least one porogen; and forming additional layers until a predetermined number of layers is reached, wherein at least one of the layers includes a porogen.

12. The method of claim 11, further comprising curing the at least one porogen at the time the at least one porogen is applied.

13. The method of claim 11, further comprising compacting, using a compaction force, at least one layer.

14. The method of claim 11, further comprising removing the one or more porogens.

15. The method of claim 14, wherein the removing of the one or more porogens comprises the application of heat.

16. The method of claim 11, wherein the powder is a plurality of powders having differing characteristics.

17. The method of claim 11, wherein applying the powder comprises selectively aligning a feed compartment, which contains the powder, with a build compartment associated with the substrate, and adjusting the height of a base of the feed compartment to dispense a predetermined thickness of powder into the build compartment and onto the substrate.

18. The method of claim 11, wherein the size of the porosity generated by the at least one porogen is below approximately 500 micrometers.

19. A porous structure formed by the method of claim 11.

* * * * *